(12) United States Patent
Genini et al.

(10) Patent No.: US 10,889,141 B2
(45) Date of Patent: Jan. 12, 2021

(54) MULTIPLE HIDDEN IMAGE SECURITY DEVICE

(71) Applicant: ROLIC AG, Zug (CH)

(72) Inventors: Reto Genini, Basel (CH); Julien Martz, Mulhouse (FR); Etienne Berner, Munchenstein (CH); Benoit Schill, Bouxwiller (FR)

(73) Assignee: ROLIC AG, Zug (CH)

( * ) Notice: Subject to any disclaimer, the term of this patent is extended or adjusted under 35 U.S.C. 154(b) by 278 days.

(21) Appl. No.: 15/571,302

(22) PCT Filed: May 23, 2016

(86) PCT No.: PCT/EP2016/061518
§ 371 (c)(1),
(2) Date: Nov. 2, 2017

(87) PCT Pub. No.: WO2016/188936
PCT Pub. Date: Dec. 1, 2016

(65) Prior Publication Data
US 2018/0272789 A1 Sep. 27, 2018

(30) Foreign Application Priority Data
May 26, 2015 (EP) ..................................... 15169102

(51) Int. Cl.
*G02B 5/30* (2006.01)
*G02B 27/28* (2006.01)
(Continued)

(52) U.S. Cl.
CPC ......... *B42D 25/364* (2014.10); *B42D 25/391* (2014.10); *B42D 25/41* (2014.10); *G02B 5/305* (2013.01); *G02B 5/3016* (2013.01)

(58) Field of Classification Search
CPC .... G02B 5/3083; G02B 5/3033; G02B 5/305; G02B 5/3016; G02B 1/04; C08L 1/12;
(Continued)

(56) References Cited

U.S. PATENT DOCUMENTS 6,144,428 A * 11/2000 Schadt .................. B42D 25/29
349/113
7,375,888 B2 * 5/2008 Moia ...................... D21H 21/48
283/90
(Continued)

FOREIGN PATENT DOCUMENTS

JP 2011-123257 A 6/2011
JP 2011-131527 A 7/2011
(Continued)

OTHER PUBLICATIONS

International Search Report for PCT/EP2016/061518 dated Aug. 4, 2016 [PCT/ISA/210].
(Continued)

*Primary Examiner* — William R Alexander
*Assistant Examiner* — Tamara Y. Washington
(74) *Attorney, Agent, or Firm* — Sughrue Mion, PLLC

(57) ABSTRACT

The invention relates to an optical security device with multiple hidden images which become visible by arranging a polarizer above or below the device. Additional images become visible upon rotation of the polarizer. The optical device comprises two patterned optical retarders and a polarizer between the retarders.

14 Claims, 9 Drawing Sheets

(51) Int. Cl.
*B42D 25/364* (2014.01)
*B42D 25/391* (2014.01)
*B42D 25/41* (2014.01)

(58) Field of Classification Search
CPC ......... C08L 1/14; C08L 67/02; H04N 13/337; H04N 13/332; H04N 13/341
See application file for complete search history.

(56) References Cited

U.S. PATENT DOCUMENTS

| | | | | |
|---|---|---|---|---|
| 8,211,338 | B2 * | 7/2012 | He | C07D 311/92 252/586 |
| 8,518,546 | B2 * | 8/2013 | He | C07D 311/92 428/412 |
| 8,545,984 | B2 * | 10/2013 | He | C07D 311/92 252/586 |
| 8,698,117 | B2 * | 4/2014 | He | C07D 311/92 250/586 |
| 8,817,043 | B2 * | 8/2014 | Nemeth | G06F 21/84 345/629 |
| 8,890,892 | B2 * | 11/2014 | Glynn | G06F 21/84 345/629 |
| 8,970,953 | B2 * | 3/2015 | Hoshino | G02B 5/3016 349/98 |
| 8,976,449 | B2 * | 3/2015 | Ida | G02B 5/3016 359/485.03 |
| 9,057,914 | B2 * | 6/2015 | Aboshi | G02B 5/3083 |
| 9,082,054 | B2 * | 7/2015 | MacPherson | H02N 2/18 |
| 9,965,979 | B2 * | 5/2018 | Wang | G09C 5/00 |
| 2003/0179363 | A1 | 9/2003 | Wang et al. | |
| 2004/0120040 | A1 | 6/2004 | Moia | |

FOREIGN PATENT DOCUMENTS

| | | |
|---|---|---|
| JP | 2014-071233 A | 4/2014 |
| WO | 98/052077 A1 | 11/1998 |
| WO | 2009/112206 A2 | 9/2009 |

OTHER PUBLICATIONS

Written Opinion for PCT/EP2016/061518 dated Aug. 4, 2016 [PCT/ISA/237].

Communication dated Mar. 17, 2020, from the Japanese Patent Office in Application No. 2017-561411.

* cited by examiner

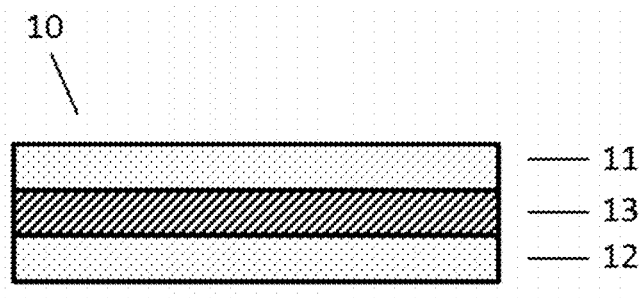
Fig. 1.1
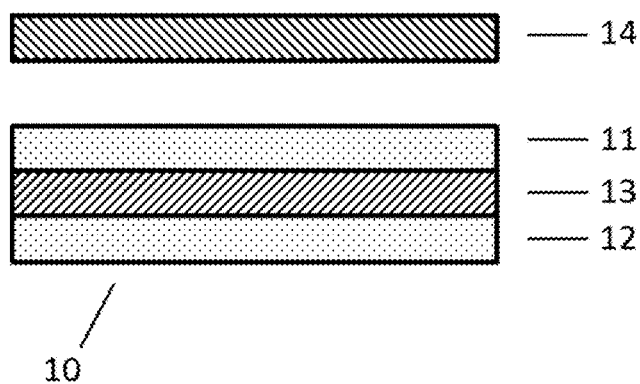
Fig. 1.2
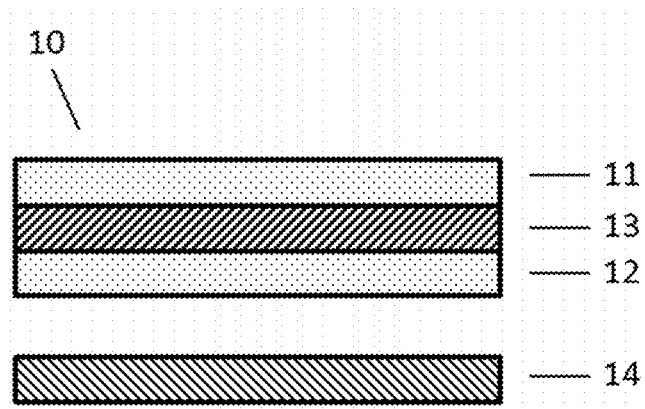
Fig. 1.3

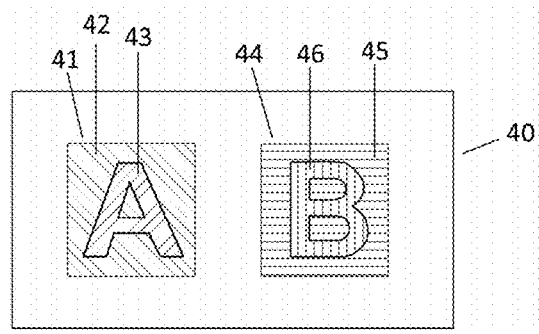
Fig. 2.1
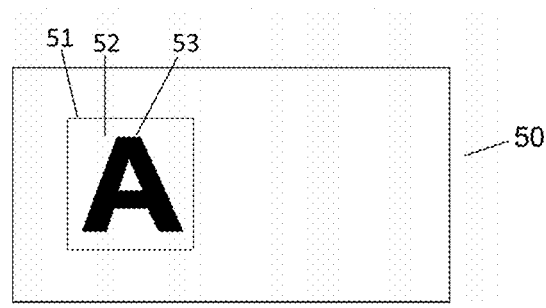
Fig. 2.2
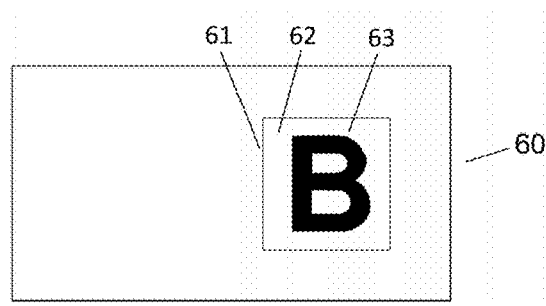
Fig. 2.3
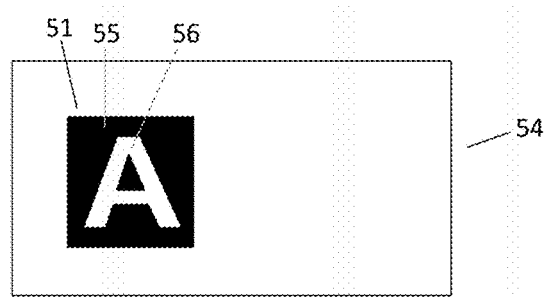
Fig. 2.4
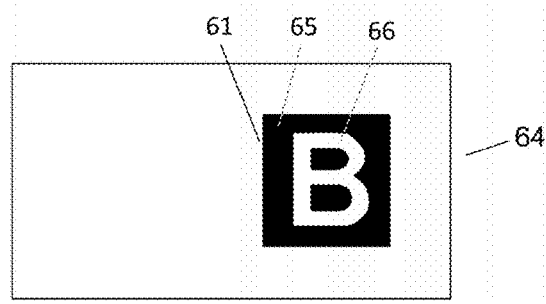
Fig. 2.5

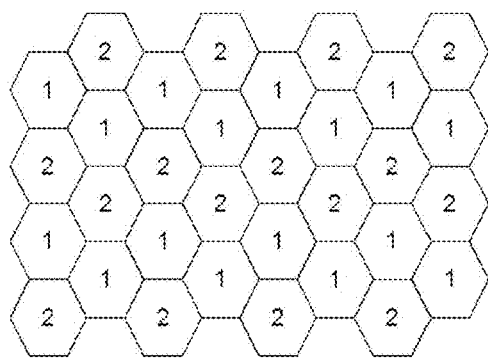
Fig. 5.1
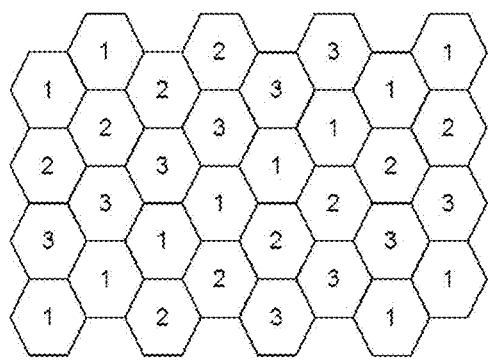
Fig. 5.2
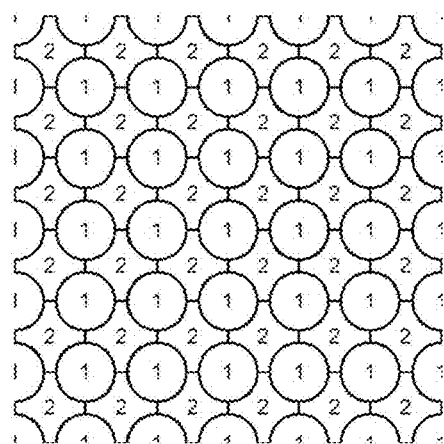
Fig. 5.3
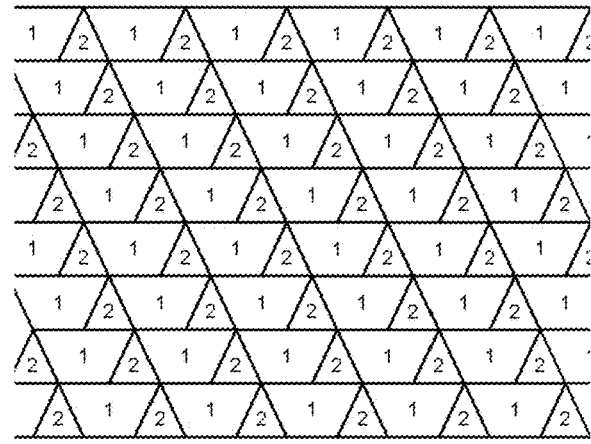
Fig. 5.4
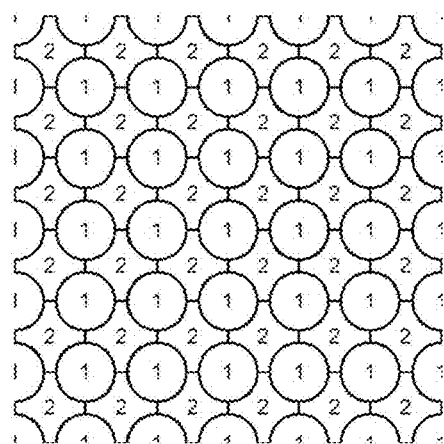
Fig. 5.5
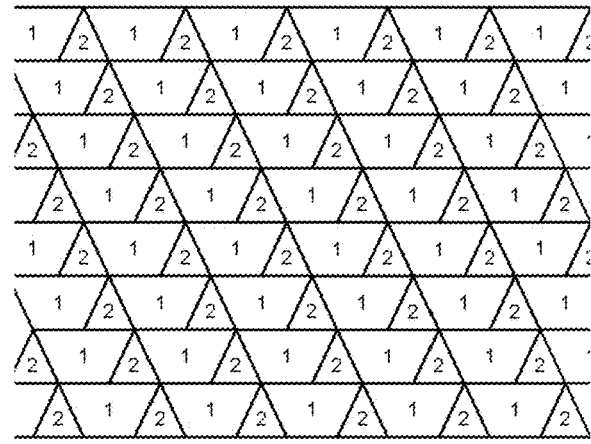
Fig. 5.6

Fig. 6.1
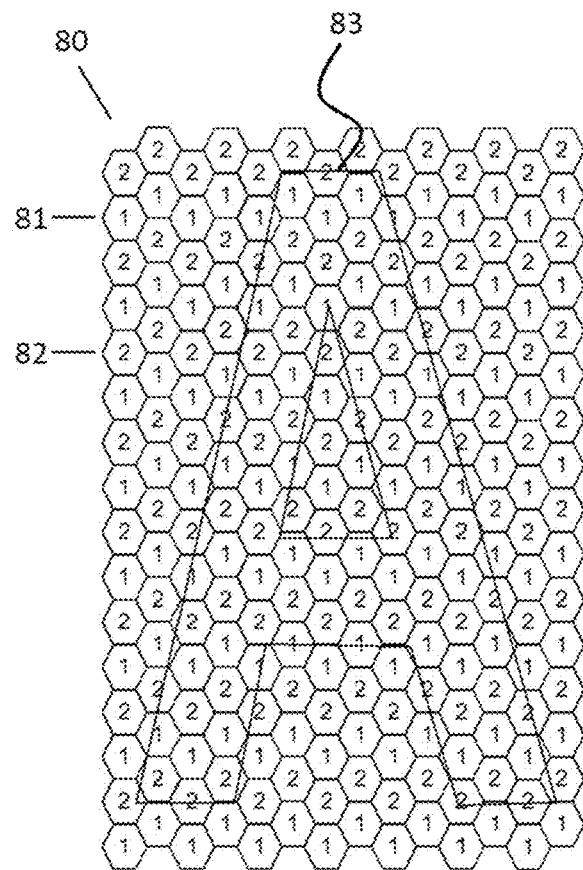
Fig. 6.2
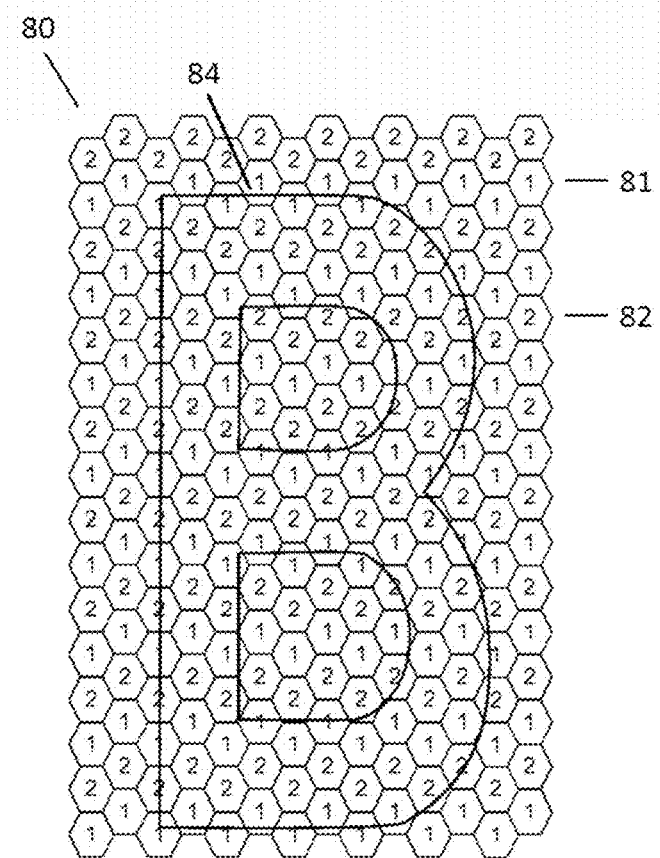

Fig. 6.3
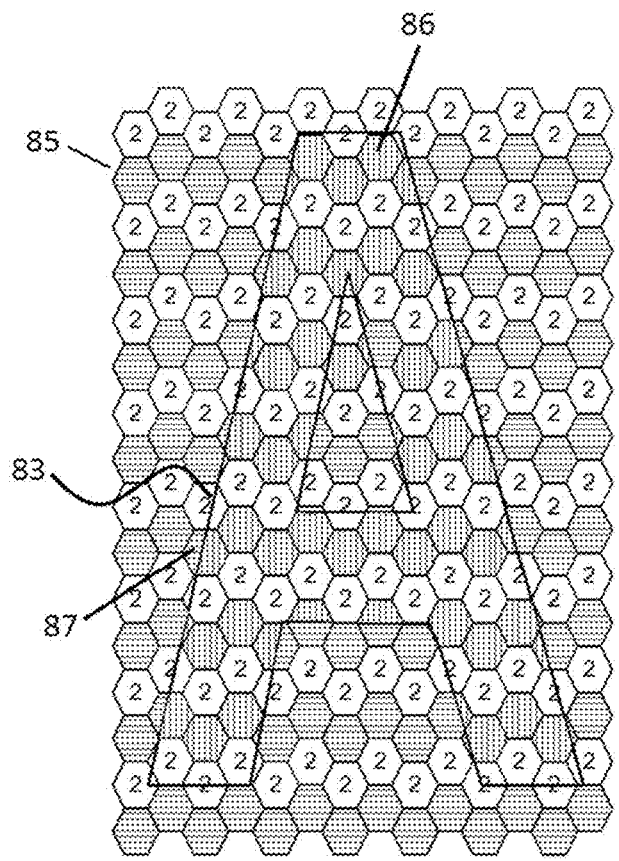
Fig. 6.4
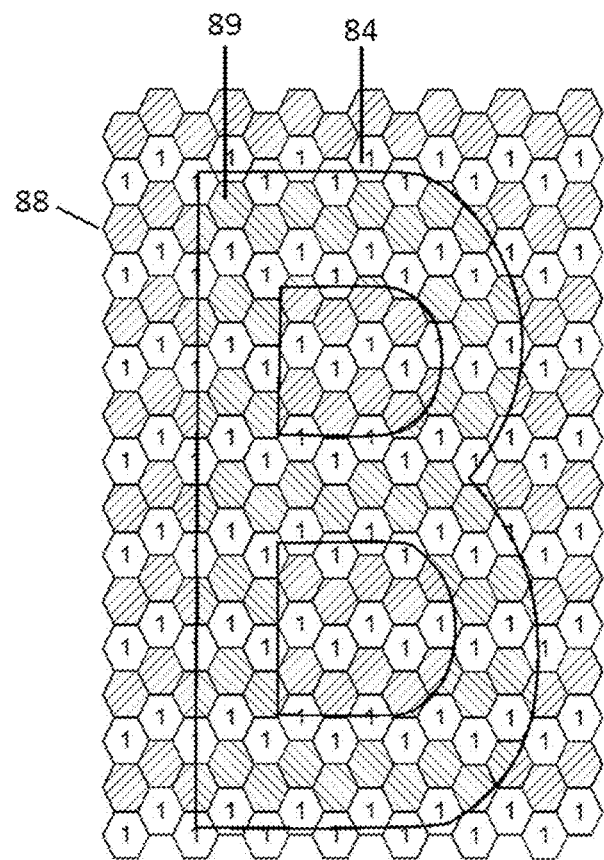

Fig. 6.5
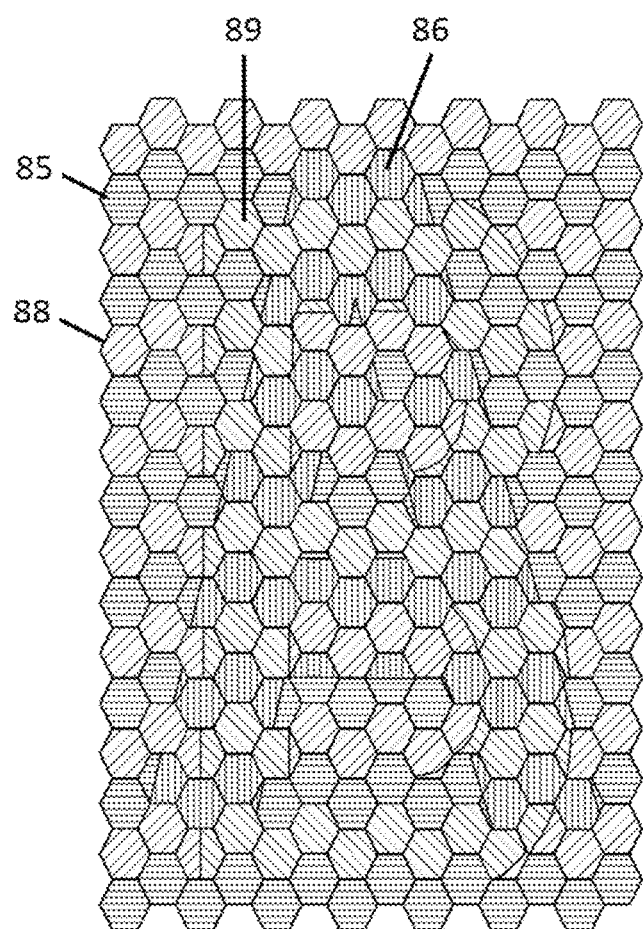

Fig. 7
Fig. 7.1
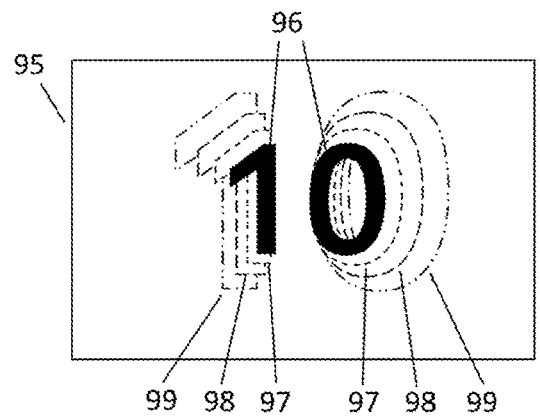
Fig. 7.2
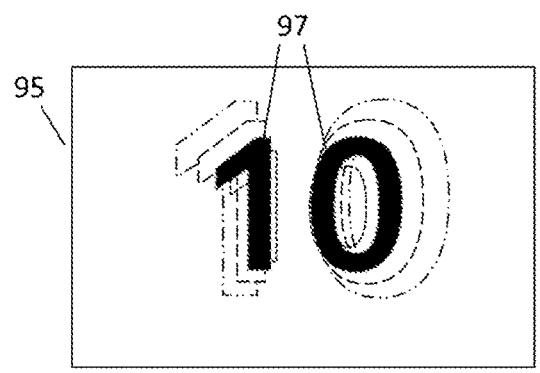
Fig. 7.3
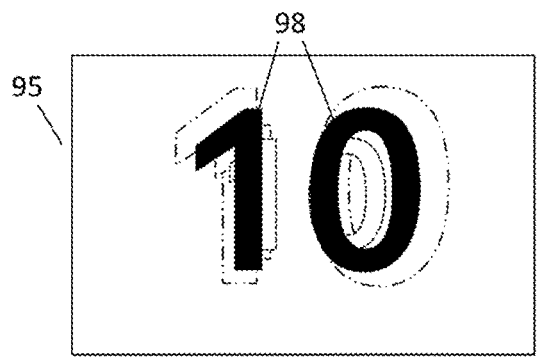
Fig. 7.4
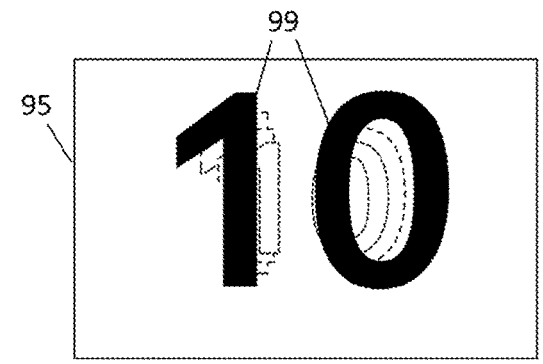

Fig. 8
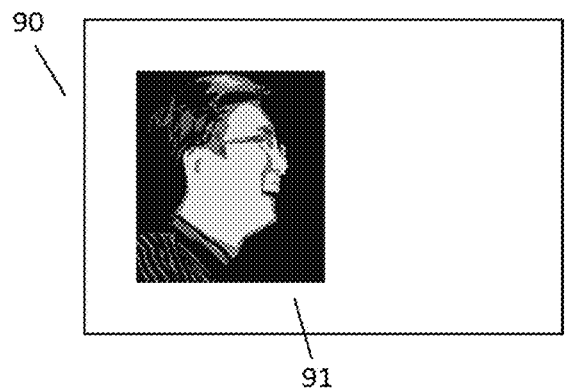
Fig. 8.1
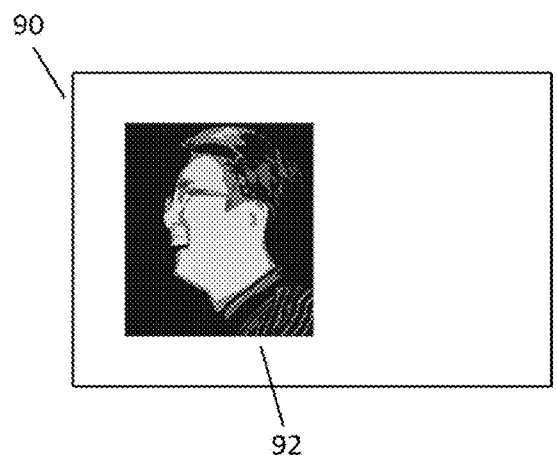
Fig. 8.2
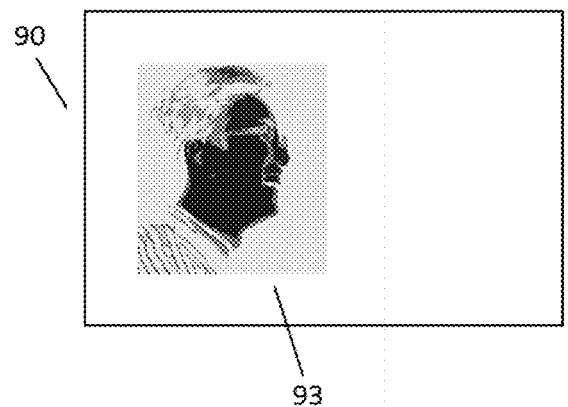
Fig. 8.3
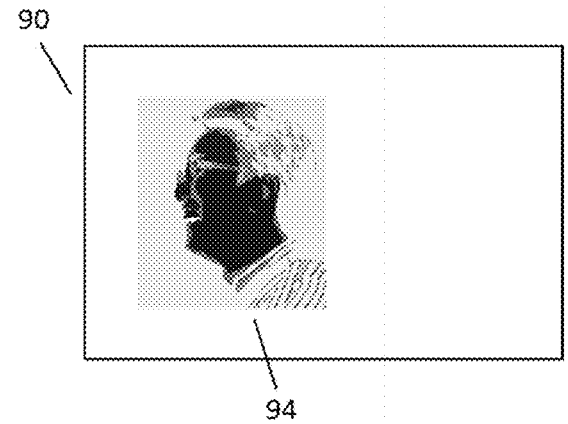
Fig. 8.4

MULTIPLE HIDDEN IMAGE SECURITY DEVICE

CROSS REFERENCE TO RELATED APPLICATIONS

This application is a National Stage of International Application No. PCT/EP2016/061518 filed May 23, 2016, claiming priority based on European Patent Application No. 15169102.9 filed May 26, 2015, the contents of all of which are incorporated herein by reference in their entirety.

TECHNICAL FIELD

The invention relates to an optical security device with multiple hidden images which become visible by arranging a polarizer above or below the device at different orientations of the polarization direction.

BACKGROUND OF THE INVENTION

Optical elements with patterned anisotropic properties are, for example, known as optical elements, which include a layer comprising polymerized or cross-linked liquid crystals with locally different optical axes directions. Such layers are, for example, prepared by applying cross-linkable liquid crystal materials on top of an alignment layer exhibiting locally different alignment directions. The liquid crystal material adopts the local alignment direction of the underlying alignment layer and is then cross-linked to fix the orientation.

The anisotropic property may for example refer to the birefringence. A pattern in a layer of a birefringent material is for example characterized by zones of different orientation of the optical axis. As an example, the above mentioned liquid crystal materials are birefringent and an orientation pattern can be achieved by an orientation pattern in an alignment layer.

An alignment layer with locally different alignment directions can easily be prepared by the photo-alignment technique, where a layer of a material, which is sensitive to the polarization of light, is exposed to linearly polarized light. Patterned alignment is achieved by changing the polarization direction of the light for the exposure of different regions of the photo-alignment layer. Detailed methods and suitable materials are, for example, described in WO 2009/112206.

Because of the different refractive indices of birefringent materials, the velocity of light propagating in a birefringent material depends on the polarization direction of the light. If polarized light enters a layer of a birefringent material with the polarization direction not parallel to one of the main axes of the birefringent material, the light is split in two rays with the polarization direction perpendicular to each other, which propagate with two different velocities. The different velocities of the light propagating through the layer causes a retardation of one of the rays against the other and therefore a phase difference results, which increases linearly with the length of the light path through the layer. For a given birefringent material the retardation of light after passing the layer depends linearly on the thickness of the layer. Any retardation can therefore be adjusted by the thickness of the layer, for example, a quarter wave or a half wave retardance.

On the other hand, if polarized light enters a birefringent layer with the polarization direction parallel to a main axis, for example, the optical axis, the polarization state of the light is not changed upon passing the layer. For a birefringent layer having an orientation pattern it is therefore possible to have linearly polarized light incident on the layer, for example, with the polarization direction parallel to the optic axis direction in a first zone and, for example, at 45° to the optic axis direction in a second zone. Accordingly, the polarization state of light is not changed in the first zone but it is changed in the second zone. If half wave retardation is chosen, then the polarization direction of the polarized light passing the layer in the area of the second zone is rotated by 90°. Accordingly, the polarization directions of polarized light passing the second zone differs by 90° from that of the first zone. Hence, if an element with a patterned retarder is properly arranged between crossed linear polarizers, then the light can pass in some areas, whereas in other areas the light is blocked. Because of these properties, optical elements with patterned retarders are used in security devices as the information stored in the form of an orientation pattern cannot be seen under normal conditions but is visible when polarized light that has passed the element is analyzed with a polarizer.

WO 98/52077 discloses an optical device comprising a stack including a first and a second patterned retarder, each encoding optical information, and a polarizer between the retarders. Hence, the device already provides one of the two polarizers required for decoding the information stored in either of the two retarders. If an external polarizer is held below or above the device, then either the first or the second retarder is located between the internal and the external polarizer and the information encoded in the pattern of the corresponding retarder becomes visible. Hence, different information may become visible depending on whether the external polarizer is held below or above the device.

Although state of the art optical elements of the above kind already provide a high level of security for security applications, there is a constant need for novel distinctive features in optical security elements for forgery protection.

SUMMARY OF THE INVENTION

An object of the present invention is, therefore, to provide an optical security device with unique features, which offers a high level of security. A further object is to provide methods for manufacturing such devices.

According to a first aspect of the invention, there is provided an optical security device including a stack comprising
- a first optical retarder layer with an orientation pattern encoding a first image
- a second optical retarder layer with an orientation pattern encoding a second image
- a polarizer between the two retarders, the polarizing area overlapping at least with a part of each retarder pattern,
- the first image becomes optimally visible when an external polarizer is held adjacent to the first retarder with the polarization direction oriented in a first direction, characterized in that the orientation pattern in the first retarder encodes for a third image, which becomes optimally visible when an external polarizer is held adjacent to the first retarder with the polarization direction oriented in a second direction.

A device according to the invention has the advantage that multiple images can be encoded and that only one tool is required to decode and visualize the images. Images appear by holding a polarizer above or below the device and additional images appear when the external polarizer is adjacent to the first retarder by rotating the polarizer. The multiple images stored in the two retarders can be synergistically combined by proper design of the retarder pattern in order to achieve surprising optical effects.

The first and the second polarization directions of the external polarizer are different from each other.

The polarizer in the device may be a linear polarizer or a circular polarizer.

The external polarizer may be a linear polarizer or a circular polarizer.

The term "optimally visible" shall mean that the image appears with maximum contrast. Preferably, the pattern in the first retarder is such that when the first image is optimally visible the third image is not or hardly visible and that when the third image is optimally visible the first image is not or hardly visible.

In the context of this application the term "image" shall stand for any kind of optical information, for example photographs, text including microtext, numbers, pictures, bar codes, symbols, characters, illustrations and graphics. Preferably, the image represents a photo, preferably a photo of a face, text, numbers or graphics.

The terms encoding and decoding of information refer to the conversion of visible information into an orientation pattern of a retarder and vice versa. For example, an area in the retarder that shall appear dark on observation has a first optical axis direction and an area that shall appear bright has a second optical axis direction. For encoding grey levels, intermediate optical axis directions may be adjusted. Encoding and decoding information in a patterned optical retarder uses methods and materials known in the art, such as layers of cross-linked or polymerized liquid crystal materials which have locally different orientation directions.

An image can only be perceived if it is displayed with an optical contrast. As a prior art example, characters printed with a black ink on a black paper are hardly visible. It is therefore important that the background on which the characters are printed differs optically from the appearance of the characters. If the characters are printed on a white paper, the image that is perceived is black characters on a white background.

On the other hand, text may be printed in white characters with black background on a white paper, for example using an inkjet or laser printer. What is actually printed in this case are not the characters, but the background, which is printed everywhere except of the area of the characters. Even though, what is perceived as optical information is the text. Therefore, in the context of this application an image is considered as one and the same image as long as the only difference is the image contrast. In particular, an image with positive or negative contrast shall be considered as the same image. In different embodiments of the invention an image may appear with positive contrast for a first polarization direction of the external polarizer and with negative contrast for another polarization direction. In such situations the positive and negative contrast images shall be considered as the same image and shall not be confused with the first and third image according to the invention.

In the above example, in which text is printed in black on a white paper the characters can be identified as the optical information and white paper as the background. However, for many images such an assignment cannot be done. For example, if the image is a black and white checkerboard, it is not clear whether the information consists of black squares on a white background or of white squares on a black background. Hence, in the context of this application the term "image" shall be understood to include every part that contributes to the perception of the image, such as in the above examples the characters and the background and the black and white parts of the checkerboard.

BRIEF DESCRIPTION OF THE DRAWINGS

The invention is further illustrated by the accompanying drawing figures. The drawings are examples only and shall help to understand the invention but shall in no way limit the scope of the invention.

FIG. 1.1 shows the layer structure of a device according to the invention. For observation of the information encoded in the pattern of the first retarder an external polarizer is arranged above the device (FIG. 1.2) and for observation of the information encoded in the pattern of the second retarder an external polarizer is arranged below the device (FIG. 1.3)

FIG. 2.1 shows a patterned retarder in a device according to the invention encoding for two images, wherein the optical axis directions in the related pattern differ from each other. FIGS. 2.2 to 2.5 show the appearance of the retarder when observed through an external polarizer oriented in different directions.

FIGS. 5.1 to 5.6 show different shapes and arrangements of image units.

FIGS. 6.1 to 6.5 illustrate the assignment of two images to a matrix of hexagonal image units.

FIGS. 7.1-7.4 shows a first retarder in a device according to the invention in which an image appears in different sizes upon rotation of an external polarizer arranged above the retarder.

FIGS. 8.1-8.4 shows a first retarder in a device according to the invention in which a first and a third image as well as the related negative images appear upon rotation of an external polarizer arranged above the retarder.

DETAILED DESCRIPTION OF THE INVENTION

Figure 3:
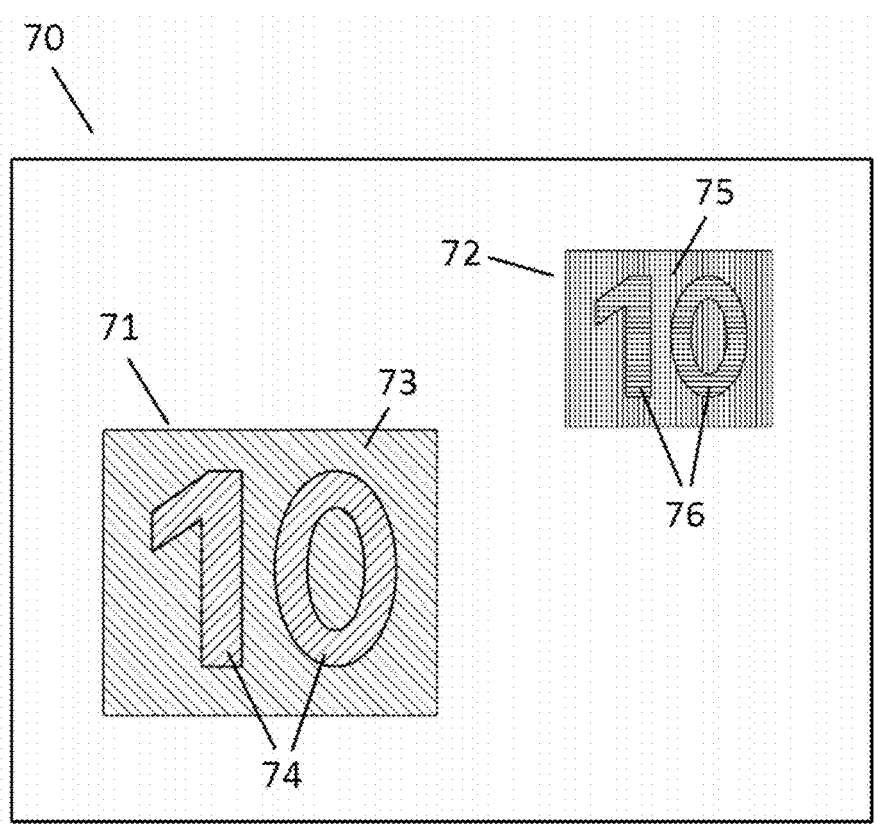
FIG. 3 shows a patterned retarder in a device according to the invention encoding for a first and a third image, wherein the third image is constructed from the first image by a scaling and a translation process.

The layer structure of a device 10 according to the invention is shown in FIG. 1.1. The device comprises a first optical retarder layer 11 with an orientation pattern encoding a first and third image, a second optical retarder layer 12 with an orientation pattern encoding a second image and a polarizer between the two retarders. The first image becomes optimally visible when an external polarizer 14 is held above the first retarder 11, as shown in FIG. 1.2, with the polarization direction oriented in a first direction. The third image becomes optimally visible when the external polarizer is rotated to a second direction. For observation of the image in the second retarder layer 12, the polarizer 14 is arranged below the retarder 12 as shown in FIG. 1.3, and rotated until the image becomes optimally visible.

The terms "above" or "below" refer to the relative position of the retarder layers in the drawings of FIG. 1 and are used within the description several times to explain the process of decoding the images. However, the positions are only relative and could be exchanged. Instead of the terms "above" or "below", the terms "in front of" or "behind" could have been used with the same meaning. To observe the image in the first retarder, the external polarizer is positioned adjacent to the first retarder. To observe the image in the second retarder, the external polarizer is positioned adjacent to the second retarder.

In a preferred embodiment of the invention also the second retarder encodes for another image. The additional image becomes optimally visible at a different direction of the external polarizer as that is required to make the second image optimally visible. Any embodiment and feature mentioned in the description and the examples in relation to the first retarder may be analogously applied to the second retarder.

If only one of the retarders encode for another image, which becomes optimally visible at another direction of the external polarizer this retarder is the first retarder, no matter at which relative position it is located in the stack. If both retarders encode for another image, which becomes optimally visible at another direction of the external polarizer, it does not matter which of the two retarders is the first or the second retarder. In this case, when reference is made to the first retarder it could be each of the retarders. It may also be that one of the retarders has a first feature and the other retarder has a second feature, although in the description it has been referred to the first retarder for both features, except if the features are synergistically dependent on each other.

It is also possible to use two external polarizers at the same time in order to observe the image stored in the first and second retarder at the same time. In this case the different images stored in the first retarder can be seen at the same time as the image stored in the second retarder. If the second retarder also encodes for more than one image then it is even possible to observe each image stored in the first retarder along with each image stored in the second retarder, by choosing the respective orientation directions of both external polarizers. This allows to generate a number of synergistic optical effects, as a result of the combination of different images stored in both retarder layers.

The retarders in the device according to the invention are operated in transmission, which means the retarder is located between two polarizers during observation of the stored images. An area of the retarder appears, for example, dark if the internal and external polarizer are crossed and the optical axis of the retarder in this area is either parallel or perpendicular to the internal or external polarizer. This does not depend on the optical retardation. For the situation that the two polarizers are crossed an area of the retarder appears bright if the optical axis in that area is not parallel and not perpendicular to one of the polarizers. If further the angle between the optical axis and the polarization directions of the two polarizers is 45° and the optical retardation is that of a half wave plate, which for green light corresponds to about 280 nm, the brightness is at a maximum. For other values of the optical retardation the brightness is lower, but as the dark state is independent from the optical retardation, an image can be observed for any retardation. Preferably, however, the optical retardation for retarders according to the invention is larger than 100 nm, more preferred larger than 140 nm and most preferred larger than 180 nm. By choosing larger retardation, an optical retarder between two polarizers appears colored. In order to achieve a colored appearance the retardation is preferably larger than 250 nm, more preferred larger than 350 nm and most preferred larger than 450 nm.

A device according to the invention may include additional layers such as alignment layers, protection layers, color filter layers, thin metallic layers, or dielectric layers.

In principle any type of polarizer may work in the device according to the invention. For example, the polarizer may be an absorptive polarizer, wherein one polarization direction of the light is absorbed. Such polarizers are available as foils which could, for example be used as a substrate for coating or laminating the retarder layers of the device. Typically the polarizer foils are based on oriented iodine molecules which are aligned in a polymer matrix. Alternatively, polarizers based on oriented dichroic dyes can be used, which are also commercially available as sheet polarizers or can be coated on a substrate from a composition containing dichroic dyes and a cross-linkable liquid crystal material. The substrate preferably has a surface which is able to align the cross-linkable liquid crystals. The polarizer may also be reflective type, which means that polarization is achieved by reflection of one polarization state and transmission of the other polarization state. Polarizers of this type are for example cholesteric layers or a film comprising a stack of a large number of alternate layers of materials with different birefringent properties, such as the DBEF polarizer developed and sold by 3M.

The two images, which, according to the invention, are encoded by the orientation pattern in the first and/or second retarder may be split up in smaller units, such as squares or lines, in the following called image units. The image units can be spaced from each other, for example to allow the first and third images to be interleaved.

The area of first and third image may overlap or may be separated.

An example of the invention is shown in FIGS. 2.1 to 2.5. In FIG. 2.1, a first retarder 40 of a device according to the invention is shown, which comprises pattern, which encode for a first and for a third image. The first image is the character "A" represented by a pattern 41 comprising an area 43 with a first optical axis direction and a background area 42 with a second optical axis direction. The optical axis directions in areas 42 and 43, for example, make an angle of 45° with each other. For example, the optical axis direction in area 43 is oriented at 0° and the optical axis direction in area 42 is oriented at 45° with regard to a reference direction. The third image 44 is the character "B" represented by a pattern 44 comprising an area 46 and a background area 45. The optical axis directions in areas 45 and 46 differ, for example, by an angle of 45°. For example, the optical axis direction in area 45 is oriented at 22.5° and the optical axis direction in area 46 is oriented at 67.5° with regard to the above reference direction. The orientation directions in the pattern 41 related to the first image are rotated with regard to that of pattern 44 related to the third image by 22.5°. The angles assumed above are examples only, and are preferred as long as only two images are to be encoded in a retarder layer, but any other angle may work.

When an external polarizer is held above the first retarder, the retarder is located between two polarizers as, according to the invention, another polarizer is part of the device and is located behind the first retarder as seen from the viewer. FIG. 2.2 shows the appearance 50 of the device when an external polarizer is held above the first retarder with the polarization direction oriented at a first direction, for which the first image 51 is optimally visible. The observer sees a dark character "A" on a bright background, which is in this case considered as a positive contrast. By rotating the external polarizer the third image 61 becomes optimally visible at a second orientation direction of the polarizer, as shown in FIG. 2.3. The observer sees a dark character "B" on a bright background; hence it appears with a positive contrast.

By further rotating the external polarizer the first image becomes optimally visible again, but with a negative contrast. The observer sees a bright character "A" on a dark background, as depicted in FIG. 2.4. Analogously, if the polarizer is further rotated, the third image appears again, but with negative contrast, as is shown in FIG. 2.5.

In general, the optical axis directions related to the first and to the third image may differ by any angle. However, it is preferred that there is a region related to the first image and a region related to the third image, such that the optical axis directions of said regions of first and third image differ by an angle between 10° and 35°, more preferred between 15° and 30° and most preferred between 20° and 25°. Optimal results may be achieved if the angle is about 22.5°.

In preferred embodiments of the invention, the third image comprises at least parts, which can be constructed as a geometric transformation of parts or of the whole first image. Examples of geometric transformations include translation, mirroring, rotation, scaling and point inversion. The center of rotation or scaling may be everywhere, in particular it could be inside the area of the image or outside of it. Preferably, the center of scaling coincides with the center of the image. Similarly, the inversion center for point inversion could be inside or outside of the area of the image. Also, the mirror line for mirroring operations may be everywhere; in particular it may be inside or outside of the area of the image. A geometric transformation may also be a combination of one or more of the above mentioned transformations in any sequence. Mirror symmetric images shall not be regarded as a result of a mirror operation. For example, letters like "A", "H", "I", "M", "O", "T", "U", "V", "W", "X" are mirror symmetric and a mirror operation could also be construed as a combination of translation and rotation. The geometric transformation shall only relate to the image, but not to the optical axis directions of the orientation pattern encoding the image. For example, if the geometric transformation includes a rotation by a certain angle, then the optical axis directions in areas related to the third image do not have to be rotated by the same angle with regard to the corresponding areas of the first image.

Different parts of an image may be transformed individually. For example, each digit of a number may be scaled from a different center of scaling.

In a preferred embodiment, the third image comprises at least parts which can be constructed from the first image or parts of it by deformation.

The advantage of the third image being constructed from the first image by a geometrical transformation is that it can easily be described to the man in the street what will happen when rotating the external polarizer into the second direction. There is no need to describe the content of the first and of the third image. It is sufficient to describe the first image and the related geometric transformation. For example, the description may be: there is a first image which is optimally visible if a polarizer is held above the first side of the device with a first direction of the external polarizer and upon rotating the polarizer or rotating the device the same image appears, but mirrored. Such an easy instruction can be memorized by any person and therefore an optical security device using such a feature can easily be verified by everybody. If the pattern in the second retarder also encodes for more than one image which appear at different polarization directions of an external polarizer, then a similar instruction can be given for the second side of the device.

FIG. 3 illustrates a first retarder 70 in an optical device as an example of the invention, wherein a third image 72 is constructed from a first image 71 by translation and scaling, which means that the image 71 appears in reduced or enlarged scale at a different position, depending on the viewing angle. The geometric transformation could also be a scaling with a scaling center outside the area of the first image. In the example, the optical axis direction in areas 74, corresponding to the digits of the number "10" in the first image 71, make an angle with the optical axis directions in the background area 73 of, for example, 45°. The image 72 is also encoded by an orientation pattern, with areas 76 and 75 representing the digits of the number "10" and the background, respectively. The optic axis directions in the areas 75 and 76 may differ, for example, by 45°. The optical axis directions in the areas of the digits 74, 76 may differ by about 22.5°. Similarly, the optical axis directions in the background 73, 75 may differ by about 22.5°. Accordingly, the first image is optimally visible for a first orientation direction of the polarizer and the third image is optimally visible for a second polarization direction. Because of the optical axis directions within the digits and in the background areas, both images 71 and 72 appear as a positive image and as a negative image, depending on the orientation direction of the polarizer.

Figure 4:
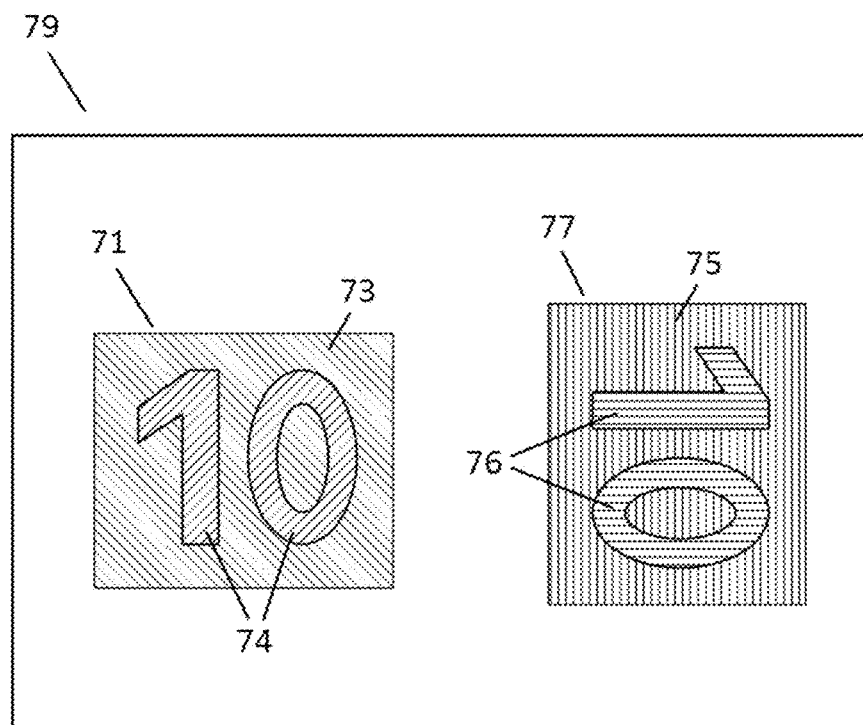
FIG. 4 shows a patterned retarder in a device according to the invention encoding for a first and a third image, wherein the third image is constructed from the first image by a rotation and a translation process.

FIG. 4 illustrates an optical retarder 79 as an example of a first retarder for a device according to the invention, wherein a third image 77 is constructed from a first image 71 by translation and rotation. In the example, the optical axis directions in the areas 74 corresponding to the digits of the number "10" in the first image 71 and the optical axis directions in the background 73 differ, for example, by 45°. The optical axis directions in the areas 75 and 76 may differ, for example, by about 22.5°. The optical axis directions in the areas of the digits 74 and 76 may differ by 22.5°. Similarly, the optical axis directions in the background 73 and 75 may differ by 45°. Accordingly, the first image is optimally visible for a first polarization direction of the external polarizer and the third image is optimally visible for a second polarization direction. Because of the optical axis directions within the digit and in the background area, both images 71 and 72 appear as a positive image and as a negative image, depending on the polarization direction.

The information content of an image may be split up in image units. Image units assigned to the first, third or additional image(s) can then be distributed such that they share a certain area. In this way it is possible to place the different images substantially at the same position, such that they partially or fully overlap. The image units may have any shape, such as a polygon, preferably a regular polygon, or a circle. Preferred shapes are quadratic, rectangular, trapezoid, triangular, hexagonal and circular. FIG. 5.1 shows an area split up in hexagons, which are assigned either to the information content of a first or of a third image. An exemplary assignment is indicated by the numbers 1 and 2 inside the hexagons, wherein the numeral 1 refers to the first image and the numeral 2 refers to the third image. FIG. 5.2 shows an example of an area split up in hexagons, wherein hexagon image units are shared between the information content of three images. An exemplary assignment is indicated by the numbers 1, 2 and 3 inside the hexagons. FIG. 5.3 shows an example of squares, assigned to the information content of the first and the third image, respectively. In FIG. 5.4 alternating stripes are assigned to a first and a third image, respectively. The image units corresponding to the information content of the different images can be arranged in different ways, for example in alternating lines, such as in FIG. 5.4, or arranged in rows and/or columns, such as in FIG. 5.3, or in more complex distributions.

The image units related to the information content of the different images may differ in size, shape and number. For example, circular areas may be used to encode the information content of the first image and the area in between the circular areas may be used to encode the information content of the third image, such as in the example of FIG. 5.5. Another example is depicted in FIG. 5.6, where trapezoid shaped units are assigned to the information content of the first image and triangular shaped units are assigned to the information content of the third image. In areas comprising image units of different images the total area of image units encoding the information content of the different images may be different, such as, for example, the total area of the trapezoid units and triangular units of FIG. 5.6. This allows to control the optical contrast of the different images and therefore to balance the optical impression. For example, it is possible that one image appears very weak, whereas another image appears with a much higher contrast and is therefore dominant. For many applications the total area of image units assigned to the individual images is about the same. In cases, in which the total area of image units assigned to the individual images is not equally balanced, it is preferred that the ratio of the largest total area to the smallest total areas is 1.3:1 or higher, more preferred 1.6:1 or higher and most preferred 2:1 or higher.

Image units can also be used to adjust the perceived grey level of an image by dithering, which means that the brightness of an area is an average over a number of image units. The image units, which cause averaging to a grey level may have, for example, two different optical axis directions, which for a certain direction of the external polarizer may be perceived as dark or bright, respectively, and which the observers eye averages to a grey impression. Preferably, an image used in a retarder of the device according to the invention has areas which encode for more than two grey levels. Even more preferred are images in which the orientation pattern encodes for more than 7, more than 15, more than 31 or more than 63 grey levels.

FIGS. 6.1 to 6.5 show an example in which the character "A" as a first image and the character "B" as a third image overlap with each other. In the example, the area 80 is divided in hexagonal image units assigned either to the first or to the third image, indicated by the number 1 for the first image inside hexagons 81 or the number 2 for the third image inside hexagons 82, respectively. FIG. 6.1 shows the desired shape and position 83 of the character "A" within the area of the hexagon matrix 80. FIG. 6.2 shows the desired shape and position 84 of the character "B" within the area of the hexagon matrix 80. FIG. 6.3 shows the patterning of the hexagon units, which are assigned to the first image, whereas the hexagons assigned to the third image are indicated by the numeral 2. In the example of FIG. 6.3 those parts of the image units which overlap with the shape 83 of character "A" have a first optical axis direction 86, whereas the non-overlapping areas have a second optical axis direction 85. In the example of FIG. 6.3 the first and second directions are assumed to make an angle of about 45° with each other. Hexagon units which partially overlap with the character "A" may have a uniform optical axis direction, for example determined by the larger of the overlapping or non-overlapping area. For better image resolution it is preferred to split the image units in overlapping and non-overlapping parts and apply the corresponding optical axis direction, as this is indicated in the drawing of FIG. 6.3 by the different hatching directions, for example in hexagon 87.

In the same way, FIG. 6.4 shows the patterning of the hexagon units which are assigned to the third image, whereas the hexagons assigned to the first image are indicated by the numeral 1. Those parts of the image units which overlap with the shape 84 of character "B" have a third optical axis direction 89, whereas the non-overlapping areas have a fourth optical axis direction 88. In the example of FIG. 6.4 the third and fourth directions are assumed make an angle of about 45° with each other. For hexagon units which partially overlap with the character "B" the area is split in overlapping and non-overlapping parts and the corresponding optical axis direction is indicated in the drawing of FIG. 6.4 by the corresponding hatching direction. The third optical axis direction 89 is preferably oriented at an angle of about +22.5° or −22.5° with regard to the first optical axis direction 86. The fourth anisotropy direction 88 is preferably oriented at an angle of +22.5° or −22.5° with regard to the second anisotropy direction 85.

The contours of the desired characters A and B in FIGS. 6.3 and 6.4 are only shown for illustration of the patterning concept but do not form part of the pattern, except of those boundaries which occur because of subdividing image units into overlapping and non-overlapping parts.

FIG. 6.5 shows the full pattern, which results from patterning according to FIGS. 6.3 and 6.4. The shapes of the characters A and B are not shown anymore, with the exception of boundaries between areas of different optical axis directions inside of image units that have been subdivided into overlapping and non-overlapping parts.

When an external polarizer is held above the first retarder of a device according to the invention, wherein the first retarder has the pattern of FIG. 6.5, the character "A" is optimally visible for a first polarization direction and the character "B" is optimally visible for a second polarization direction of the external polarizer. Both characters appear almost at the same position of the device. Because of the optical axis directions within the area of the characters and within the background, both characters appear as a positive image and as a negative image, depending on the orientation of the external polarizer.

In preferred embodiments of the invention, the third image comprises at least parts, which can be constructed by scaling at least parts of the first image, wherein areas of the first and third image overlap. Preferably, the overlapping areas are divided in image units, such that parts of the first, third or more images can be assigned to different image units as described above. The center of scaling may be inside or outside of the image. In this case the third image appears as an increased or reduced image of the related parts of the first image. Preferably, the pattern in the first retarder encodes for a fourth or more images, which appear for a third or more orientation directions of the external polarizer. The assignment as third, fourth or higher number of image shall be such that it corresponds to the sequence of the appearance of the related images when rotating the polarizer. Like the third image, the fourth or additional images comprise at least parts, which can be constructed by scaling at least parts of the first image, wherein areas of the first and fourth and optional additional images overlap. The center of scaling for the construction of the third, fourth and optionally additional images preferably coincides with each other. The scaling factor for the construction of the third, fourth and optionally additional images is different from each other. Preferably, the scaling factor increases or decreases monotonically with the sequence of the images. The optical effect that is perceived by an observer when rotating the external polarizer is that of zooming an image in or out, respectively. FIG. 7 shows an example of a first retarder which provides a zooming effect upon rotating the external polarizer. The retarder 95 comprises a first image 96, which is optimally visible for a first orientation of the external polarizer, illustrated in FIG. 7.1. The first image is the number 10 with a first size. The image is encoded by a first optical axis direction. FIG. 7.1 also indicates a third image 97, a fourth image 98 and a fifth image 99 by its contours. The first, third, fourth and fifth images partially overlap with each other. Preferably, the images in overlapping areas are split up in image units, such that parts of the individual images can be assigned to different image units as described above. Each of the third, fourth and fifth images is constructed from the first image by a different scaling factor, such that the size of the images increases in the order of the images. The scaling center coincides with the center of the first image, but it may be at any other position as mentioned above. The first, third, fourth and fifth images, are encoded by areas with different optical axis directions. The areas outside the numeral 10 may also be birefringent and may have a uniform optical axis direction but with an optical axis direction different from that which encode for either of the digits. It is also possible that the areas outside the numeral 10 are not birefringent. For the first direction of the external polarizer only the image 96 is optimally visible, whereas the images 97, 98 and 99 are only visible with a lower contrast compared to the first image 96 or are even not visible. By rotating the polarizer to a second direction, the image 97 becomes optimally visible, as is illustrated in FIG. 7.2. By further rotating the polarizer, the fourth image 98 becomes optimally visible at a third orientation of the polarizer (FIG. 7.3) and the fifth image 99 becomes optimally visible at a fourth orientation of the polarizer (FIG. 7.4). By continuously rotating the polarizer the four images become sequentially visible, which gives the impression of zooming in or out depending on the direction in which the polarizer is rotated.

In another preferred embodiment of the invention, the first image has a three dimensional appearance, which means it is perceived by an observer as having some depth. The third image is then a depth inversed image. For example, the first image may give the impression that at least parts of the image are above the plane of the device, which means between the device and the observer. The third image has then at least parts which seem to be behind the device. Preferably, the information content of first and third image is mainly identical, except of the depth perception. There are several design methods known in the art to give an image a certain depth impression. Well known examples are the button icons used in user interfaces of computer programs, which can change the appearance from non-pushed to pushed. Preferably overlapping areas of first and third image are divided in image units, such that parts of the first and third image can be assigned to different image units as described above.

In one of the preferred embodiments of the invention, the third image comprises at least parts, which can be constructed by mirroring at least parts of the first image. The mirror line can be at any position and can have any direction. Preferably, the geometric transformation from the first to the third image includes a translation. Accordingly, the third image may fully or partially overlap with the first image, even in case the mirror line is outside the area of the first image. Preferably the overlapping areas are divided in image units, such that parts of the first, third or additional images can be assigned to different image units as described above. FIG. 8 shows an example of an optical element 90 according to the invention, wherein the third image 92 in FIG. 8.2 is a mirror image of the first image 91 in FIG. 8.1 and both the first and the third image appear at the same position, but for different orientation directions of the external polarizer. By rotating the external polarizer, the observer can switch between the image and the mirror image. In addition, both the image and the mirror image appear as negative image 93, 94 in FIGS. 8.3 and 8.4 upon rotating the polarizer to additional directions. It is not required to give more detailed instructions regarding proper polarizer orientation to an observer, because then the verification of the optical features would require tools for measurement of angles and the verification process would get complex and time consuming. The only instruction which an observer needs to be able to verify the optical features is to arrange an external polarizer above the first retarder and to rotate it, as the first and third image automatically appear as positive and as negative image once the polarizer orientation adopts the corresponding orientation. Having the image and the mirror image overlapping at the same position has the surprising effect that the image makes a transition to its mirror image. Of course, it is also possible to position the mirror image somewhere else in the first retarder.

There are technologies, methods and materials known for the production of retarders with patterned orientation. For example, the retarders may include a layer comprising polymerized or cross-linked liquid crystals with locally different optical axes directions. Such layers are, for example, prepared by applying cross-linkable liquid crystal materials on top of an alignment layer exhibiting locally different alignment directions. The liquid crystal material adopts the local alignment directions of the underlying alignment layer and is then cross-linked to fix the orientation. With regard to the preparation of such optical elements reference is made to WO09112206, which is hereby incorporated by reference.

There are different methods that can be used to produce a device according to the invention. Preferably the patterned retarders are made by applying a cross-linkable liquid crystal material, for example by coating, onto a substrate with an aligning surface having the desired orientation pattern. The liquid crystal material adopts the local alignment direction of the underlying alignment layer and is then cross-linked to fix the orientation. An alignment layer with locally different alignment directions can easily be prepared by the photo-alignment technique, where a layer of a material, which is sensitive to the polarization of light, is exposed to linearly polarized light. Patterned alignment is achieved by changing the polarization direction of the light for the exposure of different regions of the photo-alignment layer. Besides using a photo-alignment layer to provide the orientation pattern for the liquid crystal material, other techniques may be used, such a embossing a structure capable of aligning liquid crystals in the surface of a substrate or a layer on the substrate.

The patterned retarders can be made on individual substrates which are then transferred to a polarizer or the substrate with the patterned retarder and the polarizer are laminated together. The same process can be used to combine the first retarder of the device and the second retarder with the polarizer. Preferably, a polarizer sheet is used as a substrate and at least one of the patterned retarders is prepared by coating or printing a liquid crystal composition onto the polarizer. There may be a separate layer on the polarizer which provides the alignment information for the liquid crystal material. The liquid crystal material adopts the local alignment direction of the underlying alignment layer and is then cross-linked to fix the orientation.

The invention claimed is:

1. An optical security device including a stack comprising:
   a first optical retarder layer with an orientation pattern encoding a first image,
   a second optical retarder layer with an orientation pattern encoding a second image, and
   a polarizer between the two retarders, the polarizing area overlapping at least with a part of each retarder pattern,
   wherein the first image becomes optimally visible when an external polarizer is held adjacent to the first optical retarder layer with the polarization direction oriented in a first direction,
   characterized in that the orientation pattern in the first optical retarder layer encodes for a third image, which becomes optimally visible when an external polarizer is held adjacent to the first optical retarder layer with the polarization direction oriented in a second direction.

2. The optical security device according to claim 1, wherein the polarizer is a linear polarizer or a circular polarizer.

3. The optical security device according to claim 1, wherein the polarizer is a reflective polarizer.

4. The optical security device according to claim 1, wherein also the second optical retarder layer encodes for a further image, which becomes optimally visible at a different direction of the external polarizer than is required to make the second image optimally visible.

5. The optical security device according to claim 1, wherein the third image comprises at least parts, which can be constructed as a geometric transformation of parts or of the whole first image, wherein the geometric transformation is one of or a combination of translation, mirroring, rotation, scaling or point inversion.

6. The optical security device according to claim 1, wherein the first and the third image overlap with each other at least partially.

7. The optical security device according to claim 1, wherein at least part of the first and/or of the third image is split up in image units.

8. The optical security device according to claim 7, wherein the shape of the image units is quadratic, rectangular, trapezoid, triangular, hexagonal or circular.

9. The optical security device according to claim 7, wherein at least part of the first and of the third image is split up in image units and the shape of the image units assigned to the information content of the first image is different from the shape of the image units assigned to the information content of the third image.

10. The optical security device according to claim 7, wherein at least part of the first and of the third image is split up in image units and wherein in areas comprising image units of both images the total area of image units encoding the information content of the first and of the third image is different from each other.

11. The optical security device according to claim 1, wherein at least for one of the images the orientation pattern in the first optical retarder layer encodes for more than two grey levels.

12. The optical security device according to claim 1, wherein the first optical retarder layer comprises a fourth or more images, which are optimally visible for a third or additional directions of the external polarizer, respectively.

13. The optical security device according to claim 12, wherein in the first optical retarder layer, the third and fourth images comprise at least parts, which can be constructed by scaling parts or the whole of the first image such that by rotating an external polarizer adjacent to the first optical retarder layer, the first, third, and fourth images successively appear with monotonically increasing or decreasing size.

14. The optical security device according to claim 12, wherein in the first optical retarder layer, the third and fourth and further images comprise at least parts, which can be constructed by scaling parts or the whole of the first image such that by rotating an external polarizer adjacent to the first optical retarder layer, the first, third, fourth and the further images successively appear with monotonically increasing or decreasing size.

* * * * *